Patented Dec. 13, 1949

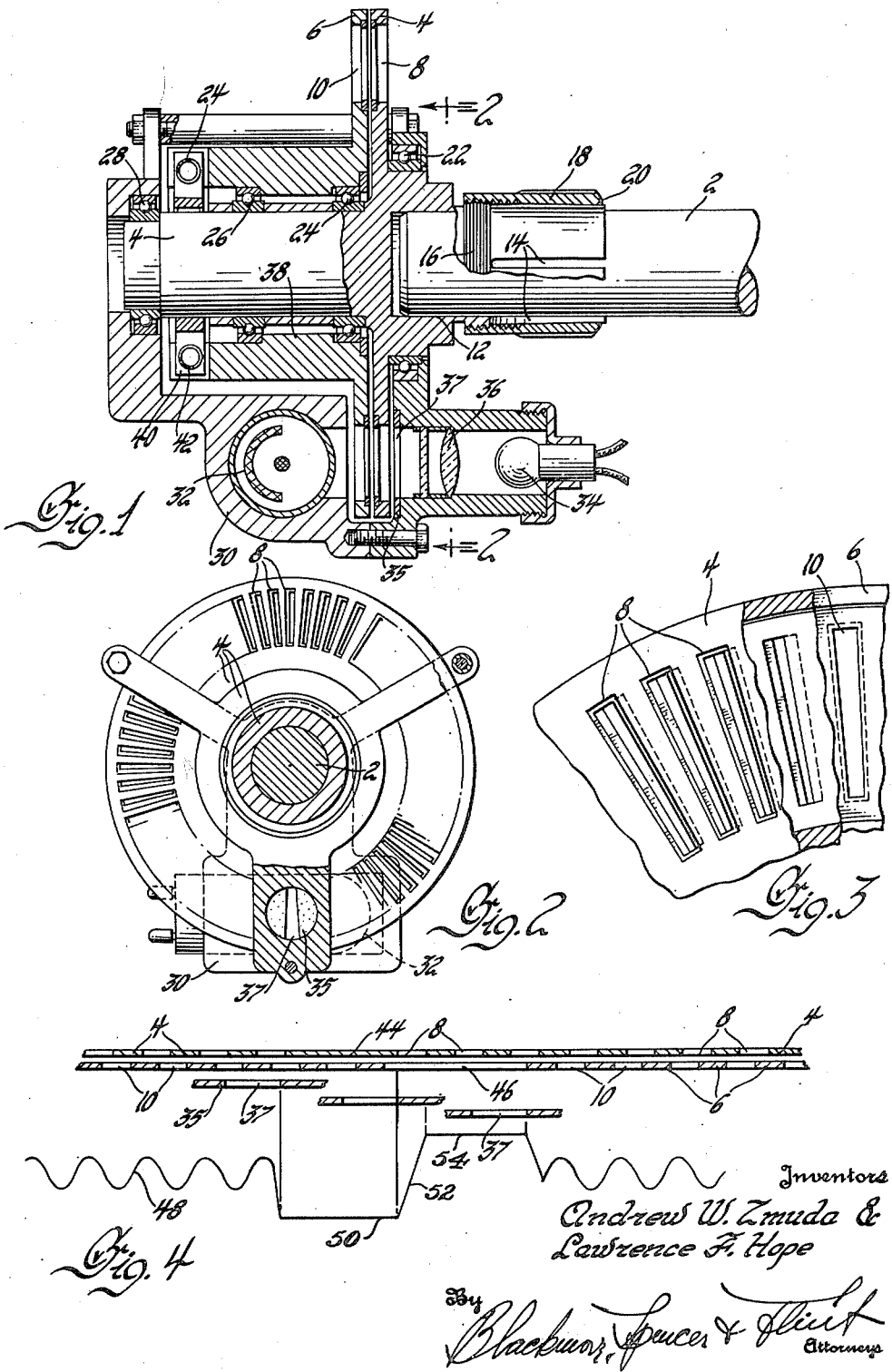

2,491,240

UNITED STATES PATENT OFFICE 2,491,240

PHOTOELECTRIC TORSIOGRAPH

Andrew W. Zmuda and Lawrence F. Hope, Detroit, Mich., assignors to General Motors Corporation, Detroit, Mich, a corporation of Delaware Application June 23, 1945, Serial No. 601,094

4 Claims. (Cl. 73—68)

This invention relates to measuring and indicating means and more specifically to measuring and indicating means for determining torsional vibration.

In rotating machinery of any kind or character there are torsional forces set up. Where the load on a particular rotating shaft or member is comparatively constant, the peripheral speed of the same will remain substantially the same. However, where there are variations in load or in the driving force, torsional vibrations will be set up in said shafts which may seriously affect the operation of the machinery and also its life. This is particularly true in some of the more recent installations in which the rotative speeds are high. It is therefore advantageous and necessary to be able to study and determine the presence of such torsional vibrations. It is, of course, essential to provide such apparatus for determining these factors so that the indicating equipment will least affect the operation of said machine and be applicable with the least amount of variation in said construction.

It is therefore an object of our invention to provide means for studying torsional vibration of a rotating body which can easily be applied thereto.

It is a further object of our invention to provide indicating means for torsional vibration utilizing photocell pick-up means which is capable of generating indications applicable to oscilloscope viewing means.

It is a still further object of our invention to provide torsiograph vibration indicating means in which an inherent calibrating signal is developed.

With these and other objects in view which will become apparent as the specification proceeds, our invention will be best understood by reference to the following specification and claims and the illustrations in the accompanying drawings, in which:

Figure 1 is a vertical sectional view taken through a torsional vibration pick-up embodying our invention applied to an end of a rotating shaft;

Figure 2 is a sectional view taken on line 2—2 of Figure 1;

Figure 3 is an enlarged view of a portion of the two scanning discs, parts being broken away and shown in section to show the various sequential portions through which the light must pass; and Figure 4 is a diagrammatic showing of the light intercepting action of a portion of the scanning discs and control slot with reference to the signal applied by the photocell pick-up to indicating means.

Referring now more specifically to the drawings, a portion of shaft 2 is shown which is the rotating body to be studied. At the end of this shaft there is to be applied a pair of circular disc members 4 and 6 having therein radial slots 8 and 10 which are separated by radial sections of the same width so that if the two series are angularly displaced, substantially no light will pass through the openings but if the two are in alignment a maximum light will flow therethrough determined by the original size of the slots. The first circular disc is adapted to be rigidly connected to the end of a member to be studied such as a shaft 2 and is therefore provided with a circular bore 12 terminating in turn in a sleeved member having axial slots 14 therein so that circumferential pressure can be applied to provide a tight press fit on an item to be tested. The outer surface of this sleeve is provided with a threaded portion 16 and a clamping cylinder 18 having a tapered integral face 20 is applied to the outer part of this sleeve to force the same radially and provide the clamping. Thus, the disc 4 is rigidly secured to and rotates with the shaft 2 and is therefore subject to any torsional vibration or speed changes which may occur in the latter.

The outer surface of the member 4 is provided at spaced axial points with mounting positions for a series of ball bearing assemblies 22, 24, 26 and 28, the assemblies 22 and 28 support a casing 30 of irregular form which is adapted to remain stationary and may be clamped or supported by any accessible framework (not shown), and which in turn houses a photo-electric cell 32 or other light sensitive means as well as a source of light 34 and a concentrating or condensing lens system 36. The casing 30 is provided with an arcuate depression through which the two discs 4 and 6 rotate, the slotted portions 8 and 10 being in juxtaposition and in alignment between the photocell and the source of light. A light control member 35 is mounted in the casing 30 and has a control slot 37 therein which determines the dimensions of the light area falling on the discs from the source. The arcuate width of the slot 37 is equal to one slot and one of its adjacent solid areas or in other terms to one light and one dark area, the purpose of which will be later explained in more detail.

Disc 6 is an integral part of cylindrical member 38 which is adapted to rotate freely upon the bearing assemblies 24 and 26 on the extension shaft end of member 4 and may therefore be considered as a seismic mass. Member 40 is rigidly attached to member 4 and connected to member 38 through compressive coil springs 42. Disc 6 is therefore free to rotate with respect to the shaft 2 but is connected to a member by soft springs 42 which will act to resiliently drive and in phased relation bring the same up to shaft speed. The operation of the two discs will be therefore that one follows accurately and studiously the rotation of the shaft, the other floating substantially freely thereon is not directly subject to minute variations in the torsional force or speed and therefore takes some little time to be affected thereby through the spring drive and the variation in the relative positions of the two can be used to indicate any torsional vibration.

These two series of slots rotating together through the line of light between the source and the photo-cell control the amount of light and therefore provide an indication of any variation which is shown on the meter. If the two series of slots 8 and 10 are in initially adjusted position, that is one half overlap, and the shaft is not subject to any torsional vibration so that the two slots remain in the same relative position, the amount of light flowing to the photo-cell 32 will not vary but produce a constant signal which can be shown on any suitable indicating means (not shown), such as a cathode ray oscilloscope. However, if the shaft 2 is subject to some torsional vibration the openings provided by the control slot and the two light slots will vary due to the change in the relative position of the two discs and also the amount of light flowing to the photo-cell 32 will vary. This signal will therefore give a periodic fluctuating reading whose amplitude is a measure of the amount of torsional vibration.

Referring now to Fig. 4, there is shown therein the two discs 4 and 6 and the control slot 37, the latter being shown in several positions to indicate relative movement of the discs. The discs 4 and 6 are shown in their initially adjusted or at rest position with the slots of one half overlapping the other. It is desired to point out at this point that the width of slot 37 is equal to one light and one dark or solid portion. Therefore if there is no relative motion between the discs 4 and 6 the amount of light falling on the cell through the control opening remains constant regardless of the movement or rotation of the two together.

This may be more clearly understood if one disc is taken for example as passing the control slot 37. Since the width of this slot is just equal to one slot 10 and the solid section adjacent thereto, the maximum amount of transmitted light is that capable of passing through one slot 10 in disc 6. However, as one edge of the slot 10 begins to pass beyond that of slot 37 the forward edge of the next slot 10 is just beginning to appear at the other side and admits light to compensate for that amount being cut off from the first-considered slot. Therefore with one disc rotating alone the amount of light falling on the cell would remain constant. The addition of the second disc only affects the situation by changing the amount of constant light falling on the cell as long as there is no relative motion between the discs. If they are so set as to be substantially in alignment then approximately the same amount of light would fall on the cell as they rotated together as when only one disc was present while if they were to be aligned with the solid portions of one practically blocking the openings in the other then a very small amount of constant light would pass through but in either case the light would be constant. In order to obtain an indication on both sides of a set index we prefer to initially set our two discs one half overlapping and the output of the cell with no torsional vibration would then be constant and give a straight line time-current relationship.

If now there appears torsional vibration impulses and relative motion between the discs 4 and 6 as they rotate past the control slot, different amounts of light will be passed to the cell which will create a fluctuating current such as shown at 48 in Fig. 4 and whose amplitude provides an index for the strength of the vibration.

One advantage of the present construction is that there is an inherent calibrating feature incorporated therein. This is also diagrammatically shown in Fig. 4. The disc 4 has therein the series of regular openings 8 except at one point in the arcuate circumference and at that point there is an elongated closed or opaque section 44. In like manner the other disc 6 has a series of slots 10 therein and at a position slightly offset from section 44 there is an elongated slotted portion 46. The relative position of these two sections of the periphery is such that they will slightly overlap and these provide for the calibrating feature. The wave diagram at the lower part of Fig. 4 shows at the left hand portion a sine wave 48 which is generated by torsional vibration as the slots pass the photo-cell. However, when they reach that portion 44 of the disc 4 the light is broken off entirely as shown by a straight line 50 or constant minimum energization of the cell 32 such as may be shown on the oscilloscope or other indicating apparatus. Thus regardless of the slots in the other disc 6 no light can pass during this interval. At the end of that interval a complete light pulse can pass for the total period represented by the slot 8 next appearing because of the elongated slot 46 in the lower disc and this permits the photo-cell to receive maximum illumination as shown by line 54.

This transition from minimum to maximum cell response must take place in the width of one slot and is shown by the sloped line 52. As exemplary of slot width but not restrictive in any sense, it may be stated that a slot width of 3 arcuate degrees has been used very satisfactorily. The total vertical distance between horizontal lines 50 and 54 is therefore equal to the slot width, in this case 3 degrees. This gives a calibration distance on the cathode ray tube or indicator and by comparing the amplitude of the fluctuating wave 48 to this vertical calibration distance the operator can tell at once the approximate amplitude of the torsional vibration present.

From the above it will be evident that we have provided a relatively simple construction easily applicable to a rotating member and which provides a quick and readily understandable indication of torque vibrations in rotating bodies.

We claim:

1. In means for indicating stresses in a rotating body, a member having light blocking and passing sections directly connected to said body, a second similar member resiliently driven from the first, the relative motion of the two forming a shutter action, a source of light and a light sensitive cell mounted on opposite sides of the members and a light control member having an aperture therein equal in width to one light passing section plus one light blocking section on said first mentioned member mounted in the line of light to control the amount of light falling on the members.

2. In means for indicating torsional vibration in a rotating body, a plurality of members having alternate light passing and blocking areas around the periphery thereof one of said members being directly connected to the rotating body and the other resiliently driven from the first, a source of light and a light sensitive cell mounted on opposite sides of said members so that the members act as a light shutter to the passage of light to the cell as relative motion occurs between the two members due to torsional vibration, and light control means having an aperture therein in the line of light falling on the members and whose width is equal to one light passing and one blocking area so that as long as no relative motion between the members occurs a constant intensity of light will fall on the cell as the members pass the same.

3. In means for indicating torsional vibration in a rotating body, a plurality of members having alternate light passing and blocking areas around the periphery thereof one of said members being directly connected to the rotating body and the other resiliently driven from the first, a source of light and a light sensitive cell mounted on opposite sides of said members so that the members act as a light shutter to the passage of light to the cell as relative motion occurs between the two members due to torsional vibration and light control means having an aperture therein in the line of light falling on the members and whose width is equal to one light passing and one blocking area so that as long as no relative motion between the members occurs a constant intensity of light will fall on the cell as the members pass the same, said one member having an extended blocking area at one point and said second member having an extended passing area in slightly overlapping relation so that the output of the cell will pass from minimum to maximum in one pulse and provide a calibrating span by which the torsional amplitude may be determined.

4. In means for indicating torsional vibration in a rotating body, a plurality of discs having a series of equally arcuately spaced light passing and blocking sections, one of said discs being directly connected to and driven by said rotating body, resilient means for driving a second disc from the first, both discs rotating about a common axis and said light passing and blocking sections acting as shutters, a source of light and a light sensitive cell mounted on opposite sides of said discs so that the discs control the flow of light to the cell, light control means in the path of light, having an aperture therein equal in width to one light passing section plus one light blocking section on said first mentioned member, to determine the area of illumination of the discs to maintain the cell output constant during periods of no torsional vibration and to allow fluctuations in said cell output of magnitude dependent on the angular amplitude of said torsional vibration.

ANDREW W. ZMUDA.
LAWRENCE F. HOPE.

REFERENCES CITED

The following references are of record in the file of this patent:

UNITED STATES PATENTS

| Number | Name | Date |
| --- | --- | --- |
| 1,571,349 | Summers | Feb. 2, 1926 |
| 2,069,271 | Prescott | Feb. 2, 1937 |
| 2,136,223 | Thomas | Mar. 8, 1938 |
| 2,147,711 | Martin | Feb. 21, 1939 |
| 2,219,298 | Dashefsky | Oct. 29, 1940 |
| 2,343,063 | Kent | Feb. 29, 1944 |

FOREIGN PATENTS

| Number | Country | Date |
| --- | --- | --- |
| 218,674 | Switzerland | Apr. 16, 1942 |
| 417,051 | Great Britain | Sept. 21, 1934 |